US009424809B1

(12) United States Patent
Jepsen

(10) Patent No.: US 9,424,809 B1
(45) Date of Patent: *Aug. 23, 2016

(54) PATTERNED PROJECTION WITH MULTI-PANEL DISPLAY

(71) Applicant: Google Inc., Mountain View, CA (US)

(72) Inventor: Mary Lou Jepsen, Sausalito, CA (US)

(73) Assignee: Google Inc., Mountain View, CA (US)

(*) Notice: Subject to any disclaimer, the term of this patent is extended or adjusted under 35 U.S.C. 154(b) by 323 days.

This patent is subject to a terminal disclaimer.

(21) Appl. No.: 13/942,467

(22) Filed: Jul. 15, 2013

(51) Int. Cl.
G09G 5/00 (2006.01)
G09G 5/377 (2006.01)

(52) U.S. Cl.
CPC ..................... G09G 5/377 (2013.01)

(58) Field of Classification Search
CPC ..................... G06F 3/1446; G06F 3/1423
See application file for complete search history.

(56) References Cited

U.S. PATENT DOCUMENTS

| 6,545,685 | B1 | 4/2003 | Dorbie |
| 7,570,227 | B2 | 8/2009 | MacKinlay |
| 2004/0048103 | A1* | 3/2004 | Walsh ............... E01F 13/028 428/690 |
| 2007/0014318 | A1* | 1/2007 | Hajjar et al. .................. 372/9 |
| 2007/0171380 | A1* | 7/2007 | Wright et al. ................ 353/69 |
| 2010/0061101 | A1* | 3/2010 | Van Pieterson et al. 362/296.01 |
| 2010/0238090 | A1* | 9/2010 | Pomerantz .......... G02F 1/13336 345/1.3 |
| 2011/0081072 | A1* | 4/2011 | Kawasaki et al. ............ 382/154 |
| 2011/0164065 | A1 | 7/2011 | Mate et al. |
| 2011/0215990 | A1 | 9/2011 | Liesenberg |
| 2011/0221995 | A1* | 9/2011 | Park ..................... G02F 1/13336 349/58 |
| 2012/0274910 | A1* | 11/2012 | Kim et al. .................. 353/79 |
| 2013/0093647 | A1 | 4/2013 | Curtis et al. |
| 2014/0267434 | A1* | 9/2014 | Kuncl .............. H04N 21/4122 345/660 |

FOREIGN PATENT DOCUMENTS

KR 1020100000116 * 1/2010

* cited by examiner

Primary Examiner — Weiming He
(74) Attorney, Agent, or Firm — Blakely Sokoloff Taylor & Zafman LLP

(57) ABSTRACT

A system for displaying a unified image on a multi-panel display includes a projector and a display engine. The projector is configured to project a patterned projection on a bezel region between an array of display panels arranged to be viewed as a multi-panel display. The display engine is coupled to drive the multi-panel display to display image sections. The patterned projection and the image sections combine to form a unified image.

20 Claims, 13 Drawing Sheets

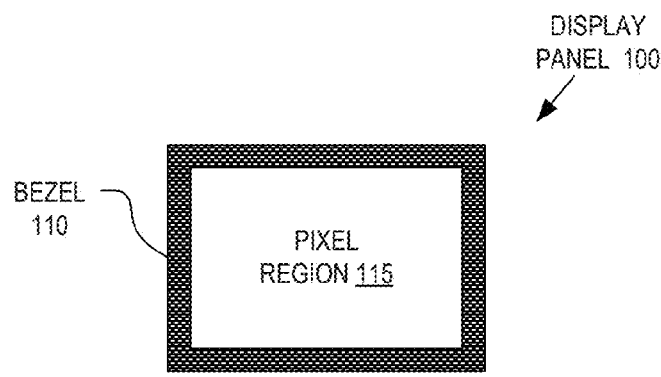
FIG. 1A    (PRIOR ART)
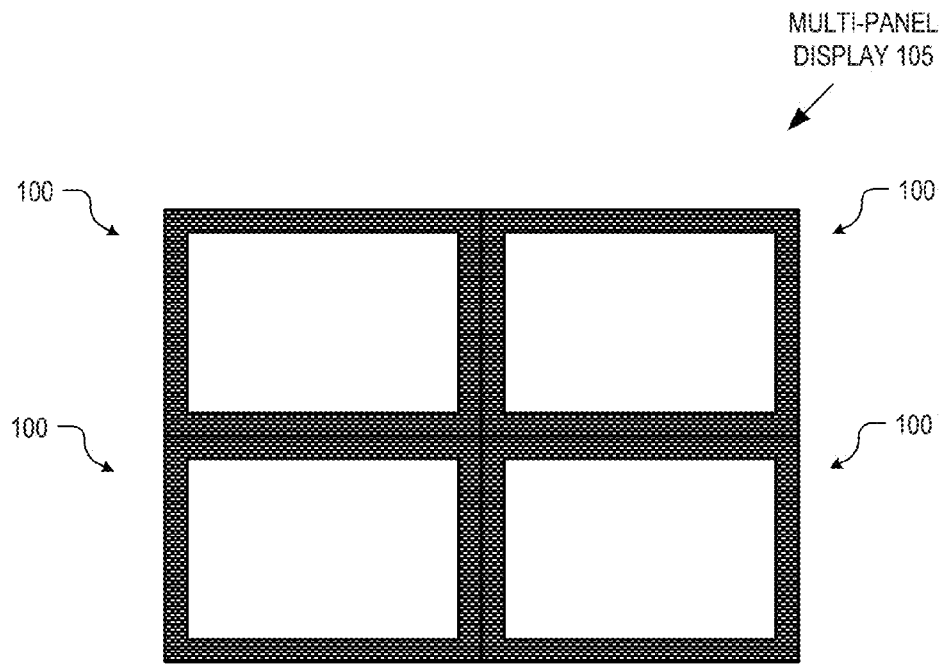
FIG. 1B    (PRIOR ART)

UNIFIED IMAGE
465

PATTERNED PROJECTION WITH MULTI-PANEL DISPLAY

TECHNICAL FIELD

This disclosure relates generally to large format displays, and in particular but not exclusively, relates to multi-panel displays.

BACKGROUND INFORMATION

Large displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall-image collectively displayed by multi-panel display 105. While multi-panel display 105 can reduce costs, visually it has a major drawback. Each display panel 100 includes a bezel 110 around its periphery. Bezel 110 is a mechanical structure that houses pixel region 115 in which the display pixels are disposed. In recent years, manufactures have reduced the thickness of bezel 110 considerably—to less than 2 mm in some instances. However, even these thin bezel trims are still very noticeable to the naked eye, distract the viewer, and otherwise detract from the overall visual experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 1A and 1B illustrate conventional display panel tiling.

DETAILED DESCRIPTION

Embodiments of a system and method for projecting a patterned projection on a multi-panel display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2A:
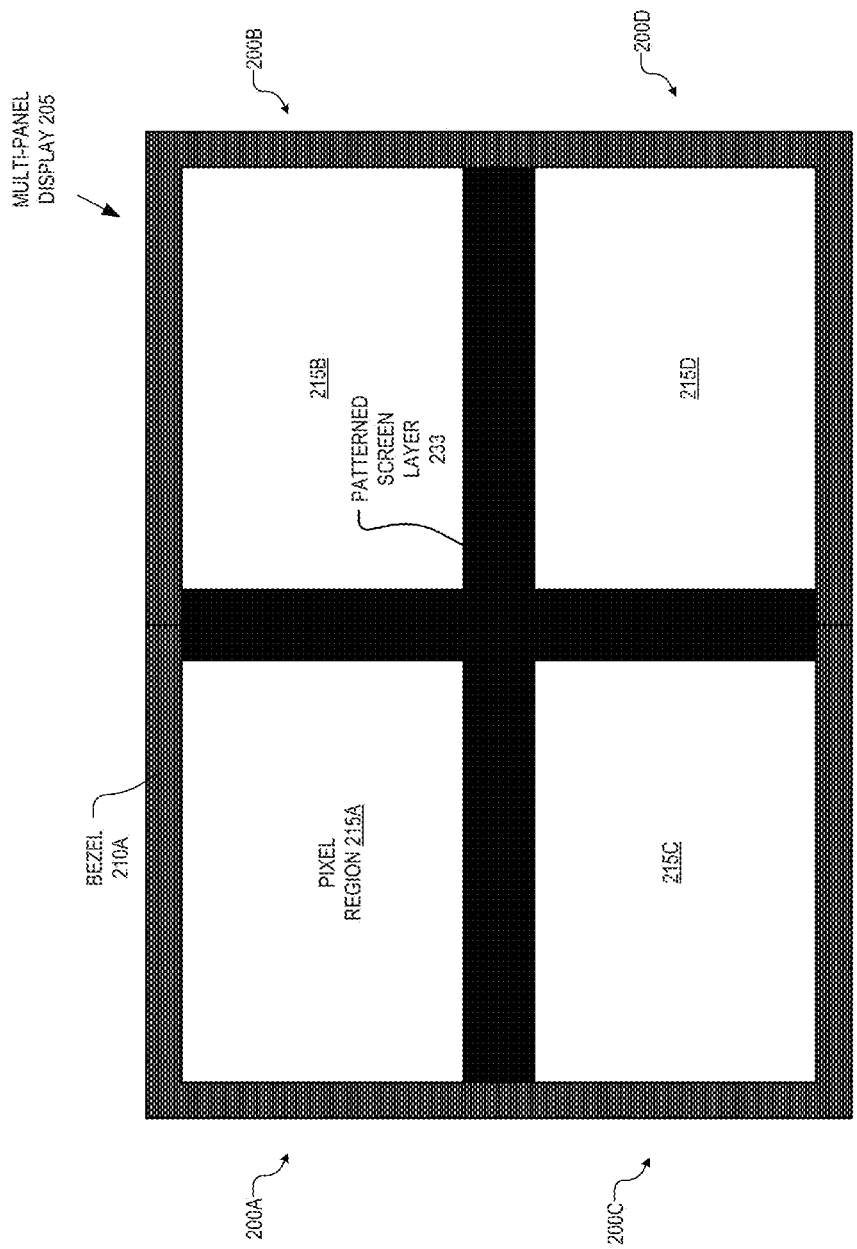
FIGS. 2A and 2B illustrate display panels arranged to be viewed as a multi-panel display with a patterned screen layer covering a bezel region between pixel regions of the display panels, in accordance with an embodiment of the disclosure.
Figure 2B:
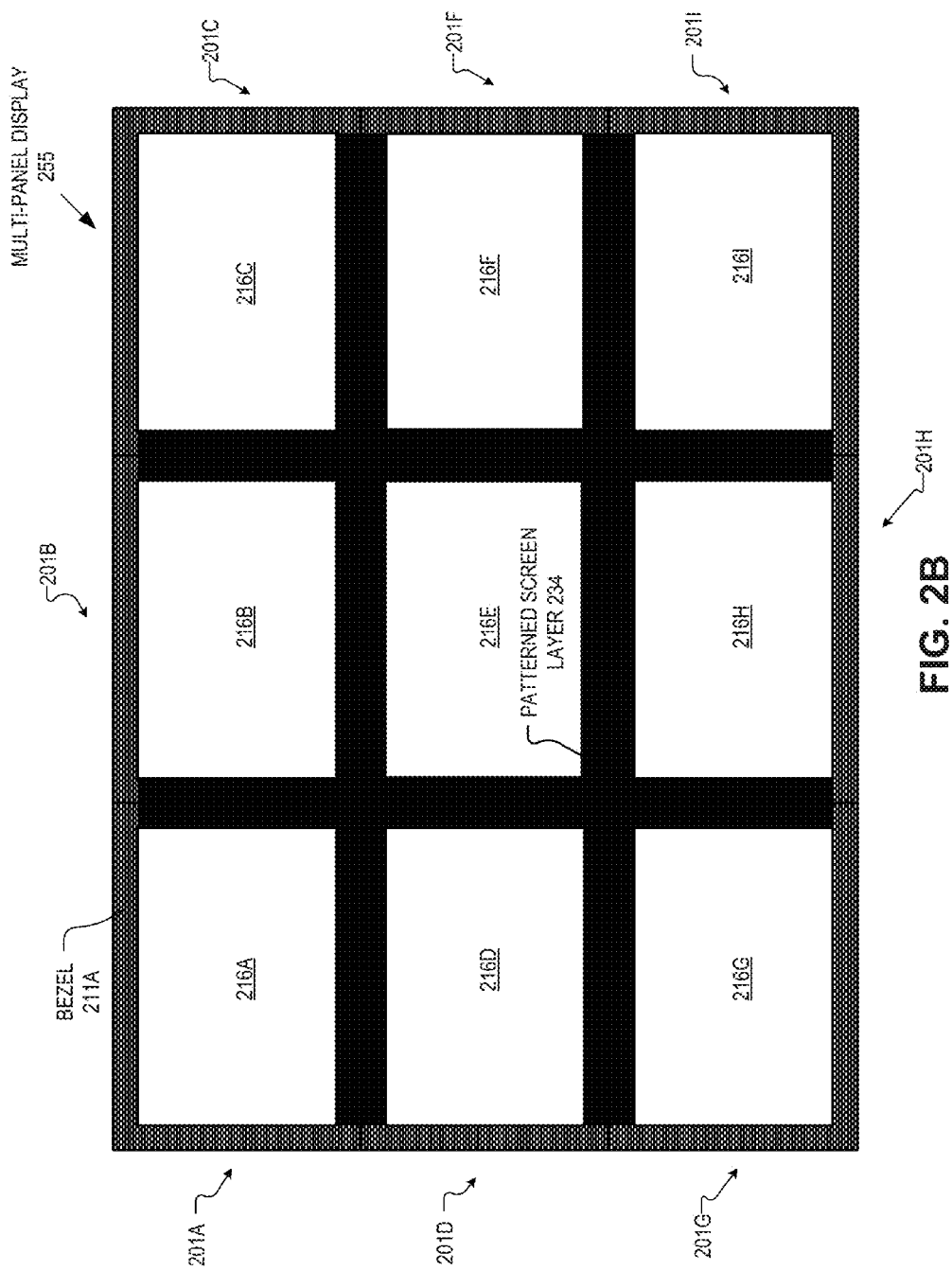

FIGS. 2A and 2B illustrate display panels arranged to be viewed as a multi-panel display, in accordance with an embodiment of the disclosure. FIG. 2A shows four display panels 200 that are arranged to be viewed as a multi-panel display 205. The four display panels 200A-200D are arranged in a two-by-two matrix and each display panel 200 includes a corresponding bezel 210 and pixel region 215. In FIG. 2A, multi-panel display 205 includes a patterned screen layer 233 shaped as a cross and covering a bezel region of multi-panel display 205. The bezel region covered by the patterned screen layer 233 is between pixel regions 215A-215D of the display panels 200A-200D of the multi-panel display 205. FIG. 2B shows nine display panels 201 that are arranged to be viewed as a multi-panel display 255. The nine display panels 201A-201I are arranged in a three-by-three matrix and each display panel 201 includes a corresponding bezel 211 and pixel region 216. In FIG. 2B, multi-panel display 255 includes a patterned screen layer 234 shaped as a "pound sign" or "hashtag" that covers a bezel region of multi-panel display 255. The bezel region covered by the patterned screen layer 234 is between pixel regions 216A-216I of the display panels 201A-201I of the multi-panel display 255. Of course, the illustrated embodiments of FIGS. 2A and 2B are exemplary and embodiments of the disclosure are applicable to other display panel arrangements.

Figure 3:
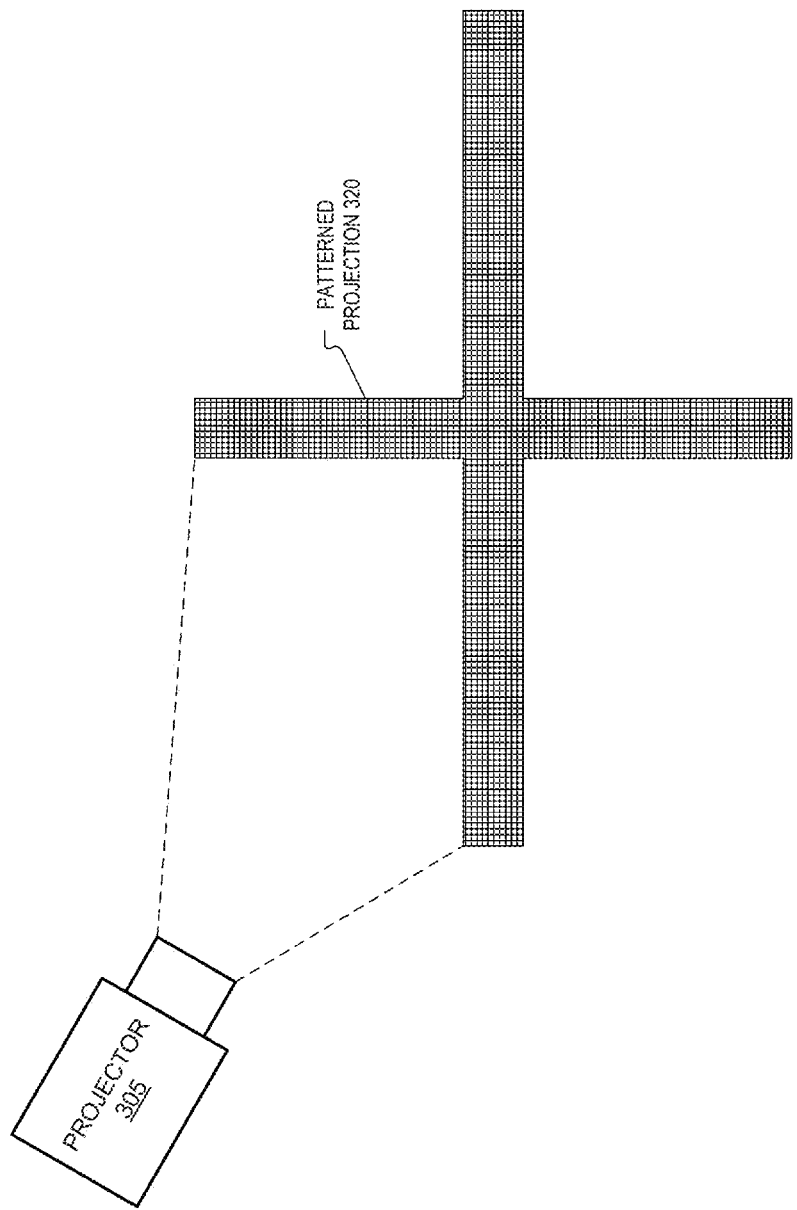
FIG. 3 illustrates a projector configured to project a pattern projection, in accordance with an embodiment of the disclosure.

FIG. 3 illustrates a projector 305 configured to project a pattern projection 320, in accordance with an embodiment of the disclosure. In FIG. 3, patterned projection 320 is designed to be projected onto patterned screen layer 233 of multi-panel display 205. Patterned screen layer 233 may be an adhesive tape applied to the bezels 210 (in the bezel area) of the display panels 200A-200D. In one embodiment, the adhesive tape is manufactured in "matte," "satin," and "polished" finishes so that the best finish can be selected to visually blend with the pixel regions 215 of display panels 200A-200D to match the grey-scale and texture of their appearance in their dark-state. This tape could also be made of a phosphor or quantum dot material that glows when projected on even with invisible or barely visible light. Display panels 200A-200D may be purchased "off-the-shelf" and patterned screen layer 233 may be applied to the bezel region after the display panels are arranged to be viewed as multi-panel display 205. Patterned screen layer 233 may be a black or dark grey color and may have a diffuse surface to facilitate displaying a projected image. This can also be segmented tape where the segments on the tape correspond to pixels, sub-pixels or groups of pixels.

When patterned projection 320 is projected on patterned screen layer 233, display panels 200A-200D and patterned projection 320 can combine to display a unified image. Projector 305 may be configured to have sufficient resolution to match the resolution and pixel size of the display panels 200 so that the unified image displayed by pixel regions 215A-215D and patterned projection 320 has homogenous (high) resolution.

Figure 4A:
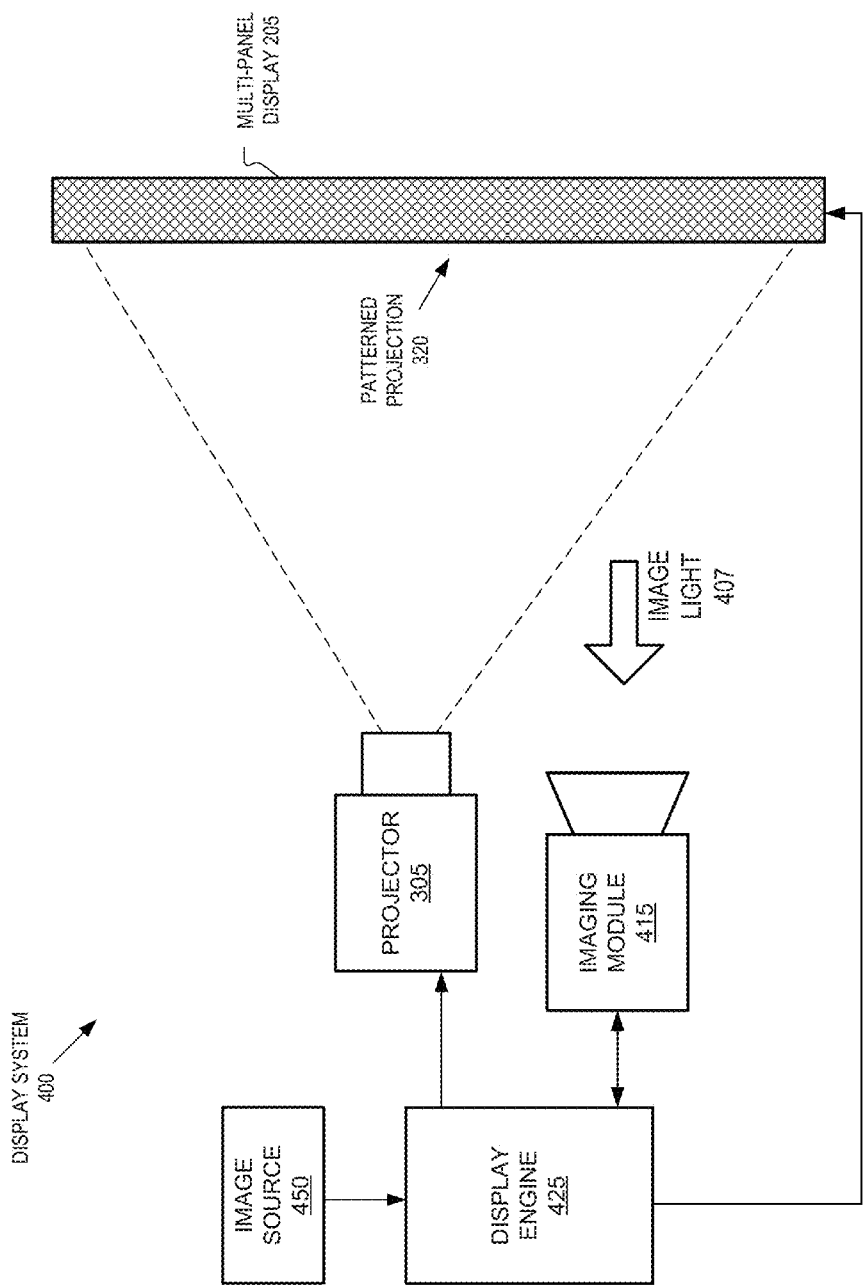
FIG. 4A illustrates an example display system including a multi-panel display, a projector, and a display engine, in accordance with an embodiment of the disclosure.

FIG. 4A illustrates an example display system 400 including multi-panel display 205, projector 305, and a display engine 425, in accordance with an embodiment of the disclosure. Display engine 425 may include a processor, a Field Programmable Gate Array ("FPGA"), or other logic for processing image data. Display engine 425 may include memory to store settings, images, and other data received. In FIG. 4A, display engine 425 is communicatively coupled to drive each of the display panels 200 in multi-panel display 205 and also communicatively coupled to drive projector 305. It is appreciated that "communicatively coupled" includes wired connections as well as wireless connections. In one embodiment, display engine 425 drives projector 305 and multi-panel display 205 over a wireless local area network ("WLAN") using an 802.11x standard as defined by the Institute of Electrical and Electronics Engineers ("IEEE").

Display engine 425 is also communicatively coupled to receive image source data from an image source 450. Image source 450 may be a computer memory, an optical disc (e.g. DVD), or otherwise. In one embodiment, image source 450 resides on a remote server and is streamed from an online streaming service. Display engine 425 may parse the image source data into the appropriate sized sections for patterned projection 320 and for displaying onto display panels 200 of multi-panel display 205.

Figure 4B:
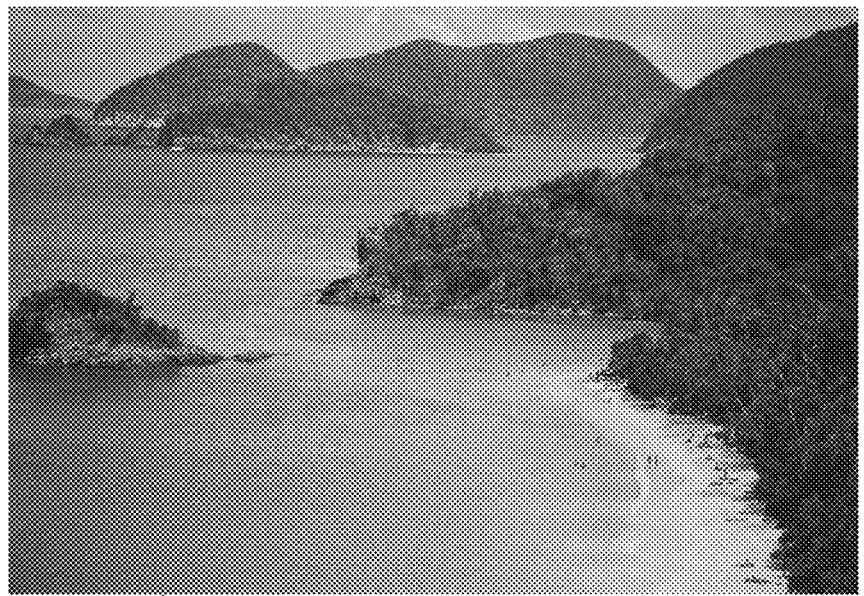
FIGS. 4B and 4C illustrate an example image and example pixel groups of an image, in accordance with an embodiment of the disclosure.
Figure 4C:
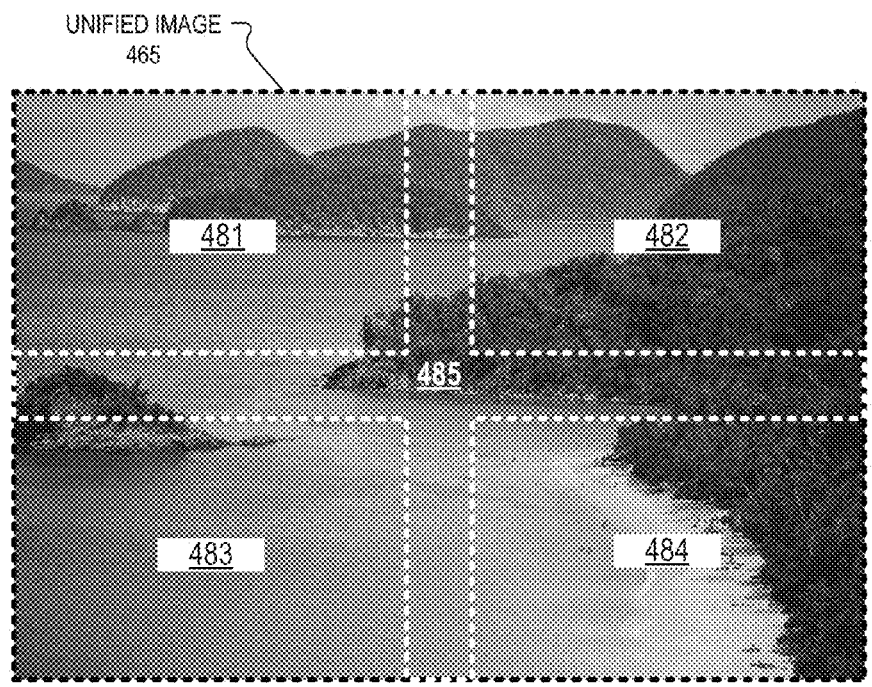

Turning to FIGS. 4B and 4C, a unified image 465 embedded in the image source data may be parsed into five pixel groups 481-485 by display engine 425. Pixel groups 481, 482, 483, and 484 may be designated as image section data to be displayed as image sections by display panels 200A, 200B, 200C, and 200D, respectively. Pixel group 485 (which is cross shaped) is designated as patterned image data to be projected by projector 305 as patterned projection 320. Display engine 425 can then send pixel groups 481, 482, 483, and 484 (designated as image section data) to multi-panel display 205 and send pixel group 485 (designated as patterned image data) to projector 305. As FIG. 4C shows, the five pixel groups, displayed as image sections and a patterned projection 320 combine to form unified image 465, which is viewed on multi-panel display 205.

In FIG. 4A, display engine 425 is also communicatively coupled to receive image data from imaging module 415, which is positioned to image multi-panel display 205. Imaging module 415 may include an array of photodiodes, one or more Complementary Metal-Oxide-Semiconductor ("CMOS") image sensors, or otherwise. Display engine 425 may control imaging module 415 to image multi-panel display 205 and imaging module 415 may send the imaging data to display engine 425. In one embodiment, imaging module 415 is a mobile device (e.g. smartphone, tablet) that has a digital image sensor. A user may take a picture of multi-panel display 205 with the mobile device and the picture may be sent (via WLAN or cellular data) to display engine 425. To calibrate projector 305 to its orientation in relation to multi-panel display 205, display engine 425 may adjust the dimensions of patterned projection 320 to fit within the bezel region (covered by patterned screen layer 233) of multi-panel display 205, in response to receiving the imaging data from imaging module 415. Adjusting the dimension of the patterned projection 320 may include adjusting optical lenses included in projector 305. In one embodiment, display engine 425 causes imaging module 415 to measure image light 407 generated by multi-panel display 205. Display engine 425 may then analyze the brightness and color properties (e.g. spectral, white state, and/or color gamut) of the image light 407 that is generated by multi-panel display 205. Based on that analysis, display engine 425 may adjust the projected brightness and projected color properties of patterned projection 320 by controlling projector 305. Tuning patterned projection 320 to match the properties of image light 407 will potentially give unified image 465 a more uniform appearance.

Figure 5:
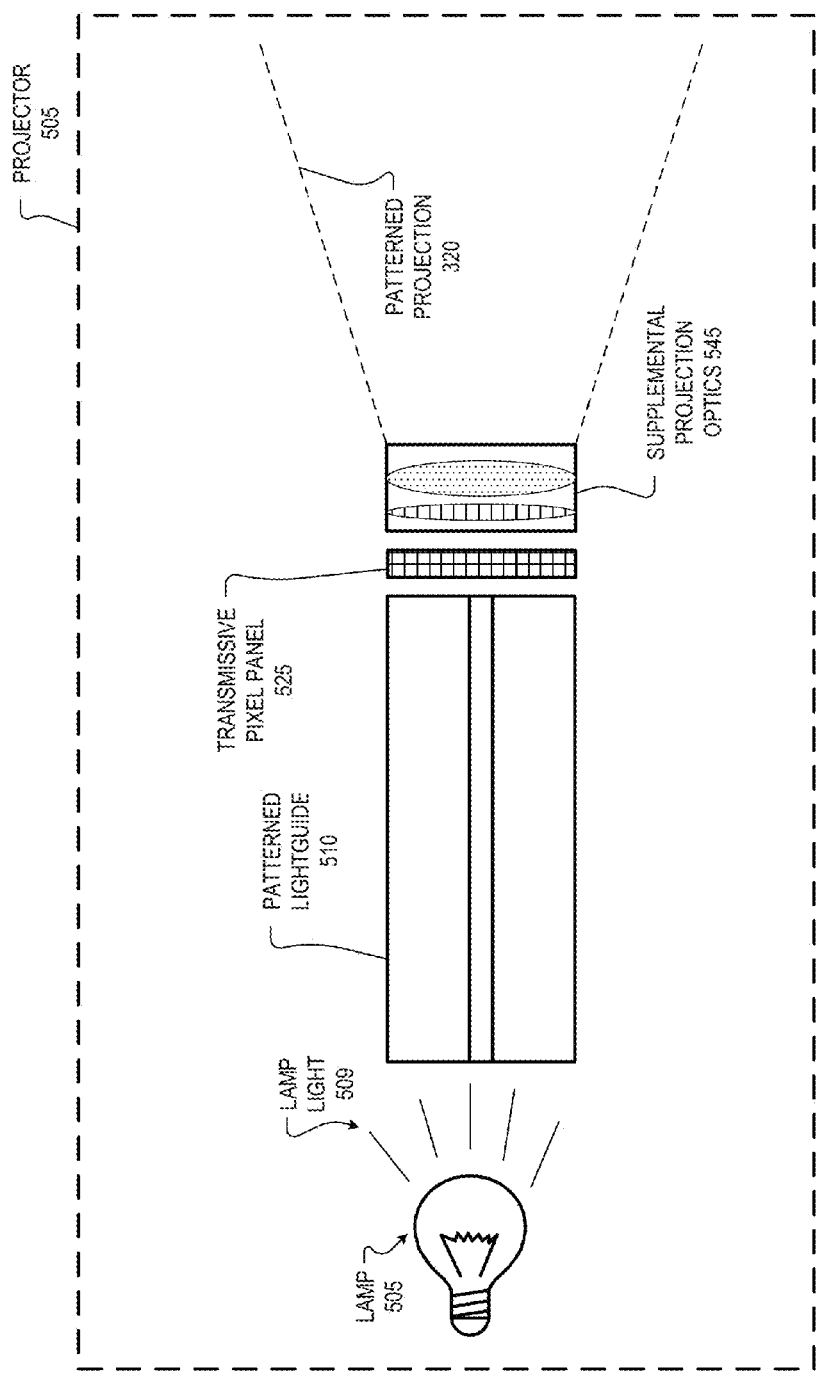
FIG. 5 illustrates a diagram of an example projector that includes a patterned lightguide for generating a patterned projection, in accordance with an embodiment of the disclosure.

FIG. 5 illustrates a diagram of an example projector 505 that includes a patterned lightguide 510 for generating a patterned projection, in accordance with an embodiment of the disclosure. Projector 505 could be used as projector 305 in display system 400. A lamp 506 emits lamp light 509 into patterned light guide 510, in FIG. 5. Lamp 506 may include a light bulb, a laser, an array of lasers, white LEDs, an array of white LEDs, red, green, and blue ("RGB") LEDs, arrays of RGB LEDs and/or other lamps known in the art for example blue or ultraviolet light sources. An optical structure (not shown) may direct lamp light 509 into patterned light guide 510.

Figure 6A:
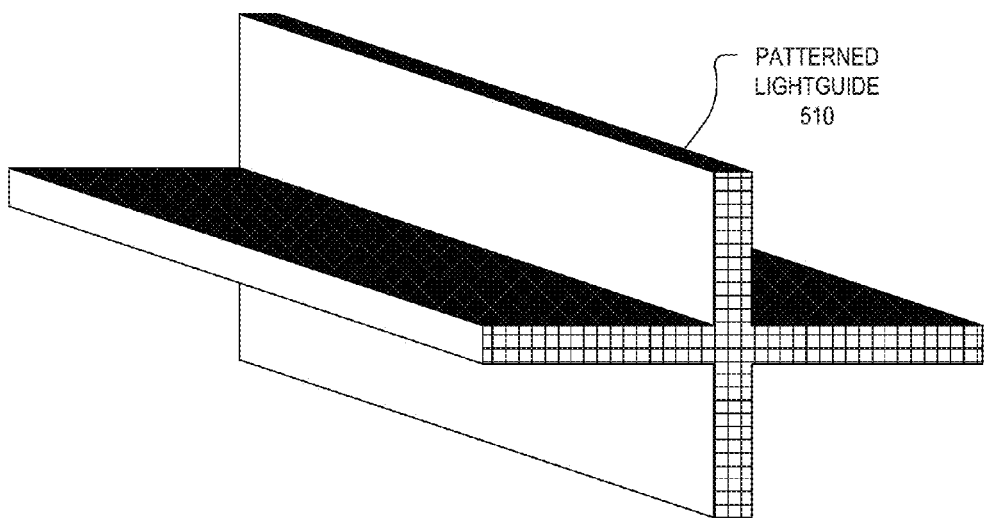
FIGS. 6A and 6B illustrate a perspective view of a patterned lightguide and a corresponding patterned projection, in accordance with an embodiment of the disclosure.
Figure 6B:
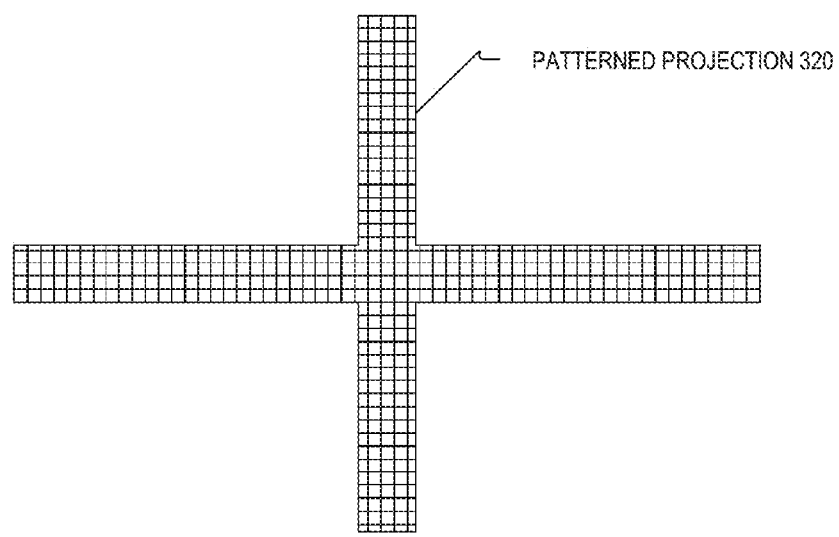

FIGS. 6A and 6B illustrate a perspective view of a patterned lightguide 510 and corresponding patterned projection 320, in accordance with an embodiment of the disclosure. As FIG. 6A shows, patterned lightguide 510 is the shape of an extruded cross, which has proportional dimensions to patterned projection 320. Patterned light guide 510 is made of an optically transmissive material such as acrylic, thermo-plastics, poly-methyl-metha-crylate (PMMA), ZEONEX-E48R, glass, quartz, etc. The selection of the optically transmissive material may need to take into consideration the heat that may be generated from lamp 506. Patterned lightguide 510 may have an extruded dimension that facilitates lamp light 509 encountering a surface of patterned light guide 510 three times (on average) to generate a patterned Gaussian light source that is suited for projecting. In one embodiment, patterned lightguide 510 relies on Total-Internal-Reflection ("TIR") to direct lamp light 509 toward transmissive pixel panel 525. In one embodiment, patterned lightguide 510 includes a reflective layer on selected outside surfaces of the patterned lightguide 510 to keep the lamp light 509 within lightguide 510.

Since patterned lightguide 510 is shaped as a cross it will produce a substantially cross shaped beam of light (a patterned beam) that will encounter transmissive pixel panel 525, in FIG. 5. Transmissive pixel panel 525 may be a Liquid Crystal Display ("LCD"), a MEMs (micro-electro mechanical), an LCOS (liquid crystal on silicon) or other imager that changes the intensity and/or colors of the patterned beam on a pixel-by-pixel basis to generate patterned projection 320. Display engine 425 is coupled to control transmissive panel 525 so that the correct image (utilizing pixel group 485) is integrated into patterned projection 320. The patterned projection may propagate through supplemental projection optics 545 to focus or adjust patterned projection 320 for projection onto patterned screen layer 233 within the bezel region of multi-panel display 205. In one embodiment, projector 505 is coupled to accept different patterned lightguides with different shapes as interchangeable parts to change the dimensions of the patterned projection. For example, if multi-panel display 255 replaces multi-panel display 205, projector 505 may include a lightguide shaped as an extruded pound sign to generate a patterned projection in the shape of patterned screen layer 234.

Figure 7:
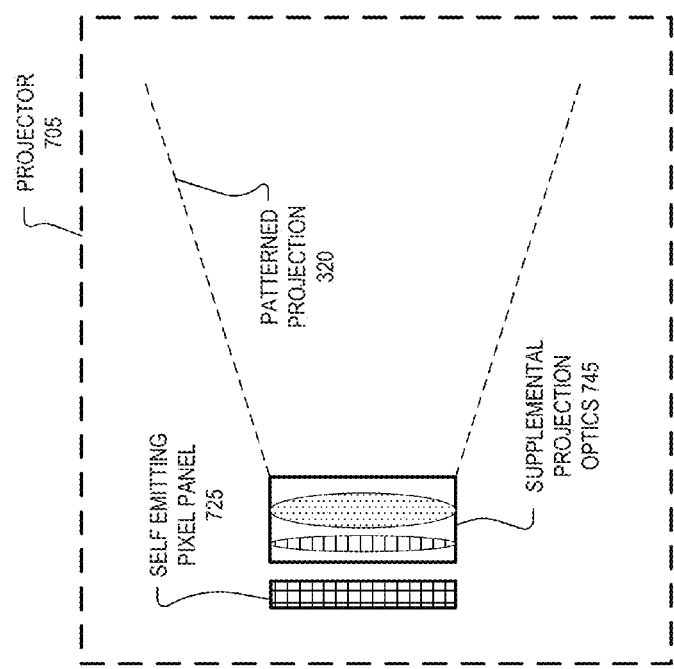
FIG. 7 illustrates a diagram of an example projector that includes a self-emitting pixel array shaped proportionally to a desired patterned projection, in accordance with an embodiment of the disclosure.
Figure 8:
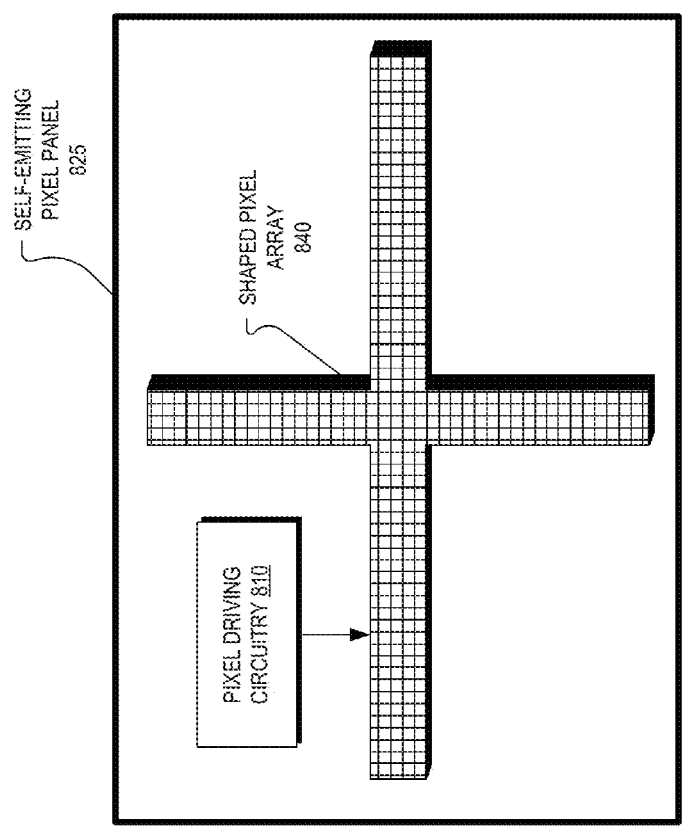
FIG. 8 illustrates an example self-emitting pixel panel, in accordance with an embodiment of the disclosure.

FIG. 7 illustrates a diagram of an example projector 705 that includes a self-emitting pixel array 725 shaped proportionally to a desired patterned projection 320, in accordance with an embodiment of the disclosure. Projector 705 could be used as projector 305 in display system 400. FIG. 8 illustrates an example self-emitting pixel panel 825 that could be used as self-emitting pixel panel 725, in accordance with an embodiment of the disclosure. Self-emitting pixel panel 825 may includes a shaped pixel array 840. Shaped pixel array 840 may include an array of LEDs arranged as pixels to generate patterned projection 320. The LEDs may be organic-LEDs ("OLED"). In one embodiment, self-emitting pixel panel 825 includes a quantum dot array arranged as pixel to generate patterned projection 320. Display engine 425 is coupled to control self-emitting pixel panel 725/825 so that the correct image (utilizing pixel group 485) is integrated into patterned projection 320.

In one embodiment, projector 705 is coupled to accept different self-emitting pixel panels with different shaped pixel arrays as interchangeable parts to change the dimensions of the patterned projection. Fabricating self-emitting pixel panel 825 may require dimensioning shaped pixel array 840 to be proportional to the desired patterned projection. In the illustrated embodiment, pixel driving circuitry 810 drives shaped pixel array 840. Pixel driving circuitry 810 may receive the patterned image data from display engine 425.

Figure 9:
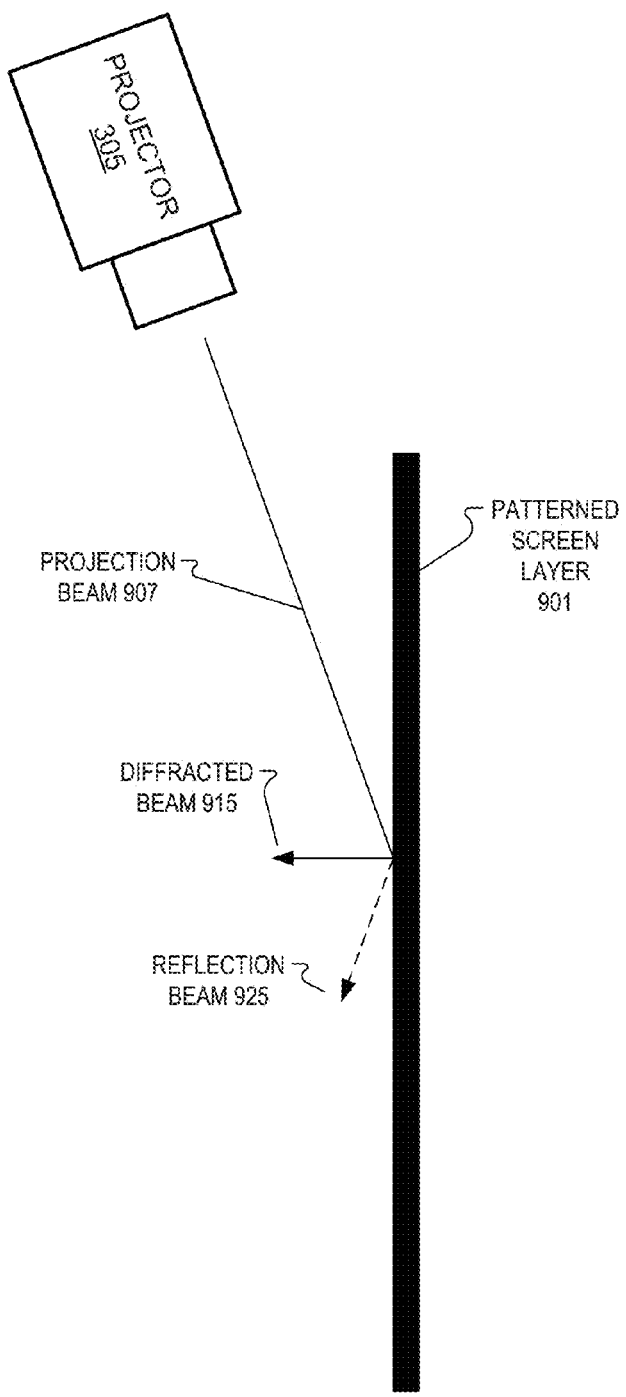
FIG. 9 illustrates an example patterned screen layer that includes a diffractive structure for directing the projected beam, in accordance with an embodiment of the disclosure.

FIG. 9 illustrates an example patterned screen layer 901 that includes a diffractive structure for directing projection beam 907, in accordance with an embodiment of the disclosure. In some display systems, projector 305 may be angled with respect to a multi-panel display. In FIG. 9, projector 305 is an over-head projector and projects projection beam 907 (which is included in a pattern projection) downward toward a multi-panel display that includes patterned screen layer 901. Reflection beam 925 illustrates a beam that would follow the law of reflection for a flat surface (a reflected beam is reflected at a same angle as the angle of incidence). However, patterned screen layer 901 includes a diffractive structure configured to direct projection beam 907 in a direction approximately normal to a multi-panel display that includes patterned screen layer 901.

Figure 10:
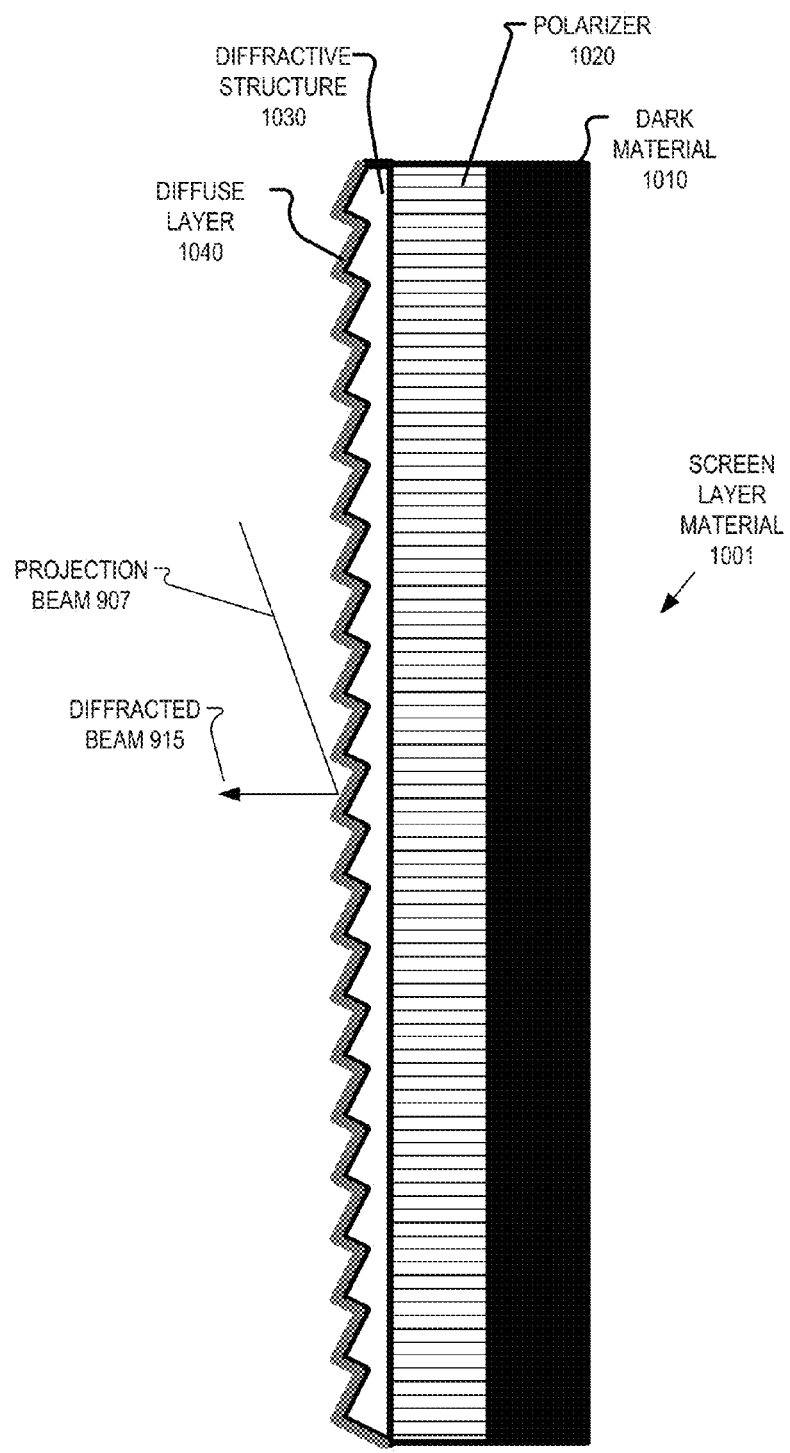
FIG. 10 illustrates an example screen layer material for use in a patterned screen layer, in accordance with an embodiment of the disclosure.

FIG. 10 illustrates an example screen layer material 1001 for use in patterned screen layer 901, in accordance with an embodiment of the disclosure. In FIG. 10, screen layer material 1001 includes a dark material 1010, a polarizer 1020, diffractive structure 1030, and a diffuse layer 1040 coating the diffractive structure 1030. Dark material 1010 may be black or grey. The color of dark material 1010 and selection of polarizer 1020 may be configured to match pixel region 215 of display panels 200 to give a uniform appearance. The diffractive structure in patterned screen layer 901 may need to be designed with knowledge of an approximate position that projector 305 will be positioned relative to the multi-panel display (e.g. multi-panel display 205) in order to have the diffractive structure facilitate directing projection beam 907 approximately normal to the multi-panel display as diffracted beam 915. FIG. 10 shows that diffractive structure 1030 is configured to direct projection beam 907 in a direction substantially normal to the screen layer material 1001, and consequently, from a multi-panel display that includes screen layer material 1001.

In one embodiment, patterned screen layer 233 includes phosphorescent or fluorescent materials that are selectively activated (pixel by pixel) by the projection system so that the phosphorescent or fluorescent material emits display light in response to being activated by light from the patterned projection. The light from the patterned projection may be non-visible light. The distribution of fluorescent can be patterned or unpatterned. In one example, the distribution of different phosphorescent or fluorescent material includes patterning different color pixels to facilitate a color display on patterned screen layer 233.

Figure 11:
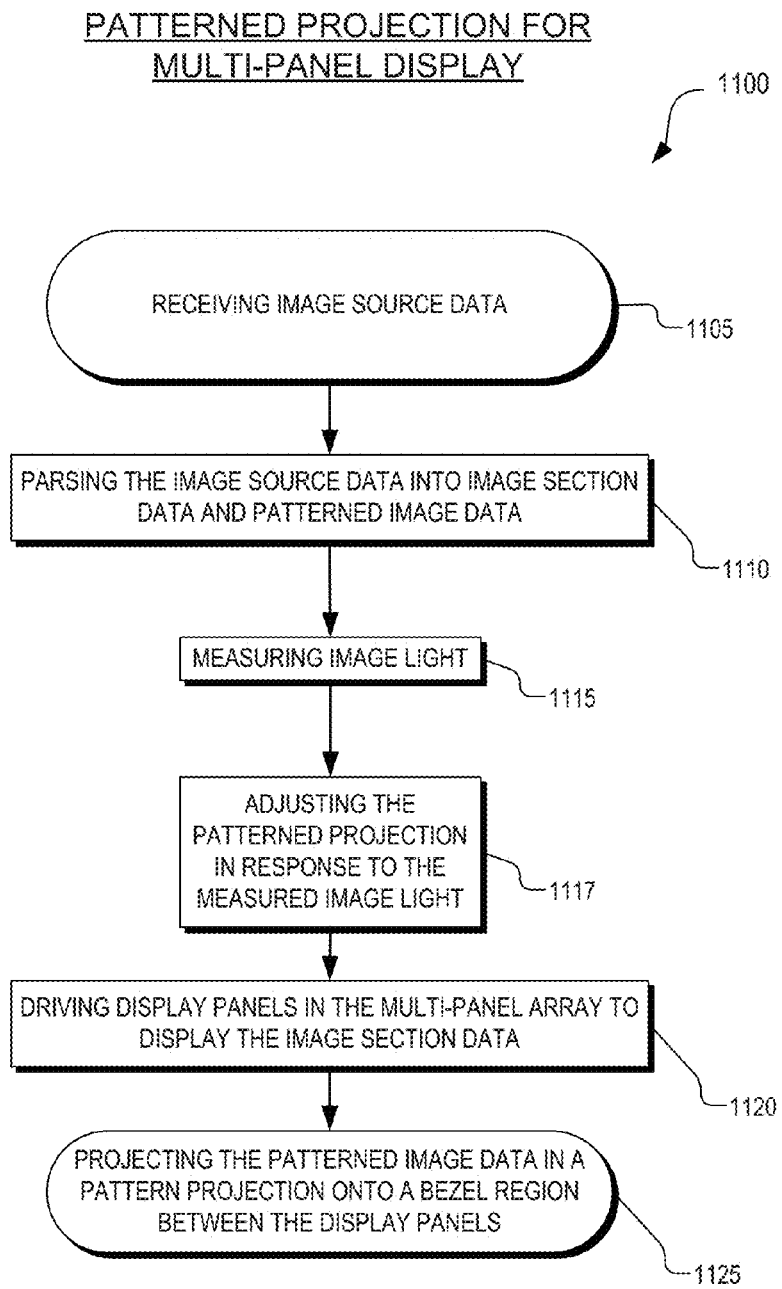
FIG. 11 illustrates a process of operating a display system that includes a projector configured to project a patterned projection, in accordance with an embodiment of the disclosure.

FIG. 11 illustrates a process 1100 of operating a display system that includes a projector (e.g. projection 305) configured to project a patterned projection (e.g. patterned projection 320), in accordance with an embodiment of the disclosure. The order in which some or all of the process blocks appear in process 1100 should not be deemed limiting. Rather, one of ordinary skill in the art having the benefit of the present disclosure will understand that some of the process blocks may be executed in a variety of orders not illustrated, or even in parallel.

In process block 1105, image source data is received. Image source data may be received from image source 450, for example. The image source data may be encoded image data from a DVD or streaming digital media. In process block 1110, the image source data is parsed into image section data and patterned image data. Image section data may include data for pixel regions 215A, 215B, 215C, and 215D. The patterned image data may include data to be projected on patterned screen layer 233. Optionally, image light is measured by an imaging module (e.g. imaging module 415), in process block 1115. The image light may be generated by the pixel regions of a multi-panel display. In process block 1117, the patterned projection is optionally adjusted in response to the measured image light. Imaging module 415 may measure image light and send imaging data to the display engine and the display engine may analyze the image light and control projector 305 to adjust the patterned image light. In process block 1120, display panels (e.g. display panels 200) in a multi-panel display are driven to display the image section data. Display engine 425 may drive display panels 200 in multi-panel display 205. In process block 1125, the patterned image data is projected as a patterned projection (e.g. patterned projection 320) onto a bezel region between the display panels of the multi-panel display.

It is appreciated that although embodiments of the disclosure are largely described with reference to a two-by-two matrix of display panels arranged to be viewed as a multi-panel display (e.g. multi-panel display 205), other configurations (e.g. FIG. 2B) are possible and embodiment of this disclosure can be modified by those skilled in the art to accommodate different configurations. It is also contemplated that in some embodiments, more than one projector may be used to project patterned projections onto multi-panel displays.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A multi-panel display system comprising:
    an array of display panels arranged to be viewed as a multi-panel display, the multi-panel display including an adhesive tape covering a bezel region on a front side of the multi-panel display, wherein the bezel region is between pixel regions of the display panels in the array, and wherein the adhesive tape covering the bezel region reflects images projected thereon;
    a display engine communicatively coupled to drive the multi-panel display to display image sections, the image sections generated by the array of display panels and viewable from a front side of the array of display panels; and
    a projector, facing the front side of the array of display panels, coupled to project a patterned projection onto the adhesive tape, wherein the adhesive tape reflects the patterned projection, wherein the patterned projection reflected by the adhesive tape and the image sections generated by the array of display panels combine to form a unified image, and wherein the display engine is communicatively coupled to drive the projector to project the patterned projection.

2. The multi-panel display system of claim 1 further comprising:
    an imaging module communicatively coupled to provide imaging data from the multi-panel display to the display engine, and wherein the display engine is configured to adjust the patterned projection in response to the imaging data.

3. The multi-panel display system of claim 1, wherein the projector includes a patterned light guide shaped to output a projection beam in a shape of the adhesive tape, the shape of the adhesive tape based on a number of display panels in the array of display panels.

4. The multi-panel display system of claim 3, wherein the projector is further coupled to accept different patterned light guides as interchangeable parts to change dimensions of the patterned projection.

5. The multi-panel display system of claim 1, wherein the projector includes a self-emitting pixel array shaped proportionally to the patterned projection.

6. The multi-panel display system of claim 5, wherein the projector is further coupled to accept different self-emitting pixel arrays as interchangeable parts to change dimensions of the patterned projection.

7. The multi-panel display system of claim 1, wherein and wherein the patterned projection and the adhesive tape are shaped as a cross.

8. The multi-panel display system of claim 1, wherein the multi-panel display includes nine display panels arranged in a three-by-three matrix, wherein the patterned projection and the adhesive tape are shaped as a pound sign.

9. The multi-panel display system of claim 1, wherein the projector is positioned to project the patterned projection at an angle relative to the adhesive tape, and wherein the adhesive tape includes a diffractive structure configured to direct the patterned projection in a direction approximately normal to the multi-panel display.

10. The multi-panel display system of claim 1, wherein the projector includes a non-visible light source to generate the patterned projection, and wherein the adhesive tape includes a phosphorescent or fluorescent material that is selectively activated to emit display light by the patterned projection.

11. The method of claim 10, wherein the phosphorescent or fluorescent material is included in the adhesive tape.

12. A display system comprising:
    a projector configured to project, from a viewing side of the display system, a patterned projection onto a bezel region on a front side of the display system, wherein a pattern of the patterned projection is based on a number of display panels in the display system;
    a display engine including a processor coupled to receive image source data and coupled to drive an array of display panels of the display system, wherein the display engine is also communicatively coupled to the projector; and
    a non-transitory machine accessible medium that provides instructions that, when executed by the display system, will cause the display system to perform operations comprising:
        parsing the image source data into image section data and patterned image data;
        transmitting the image section data for driving the display panels; and
        transmitting the patterned image data to the projector, wherein the image section data is for displaying on pixel regions of the display panels and wherein the patterned image data is included in the patterned projection for projecting onto the bezel region on the front side of the display system, the bezel region being between the pixel regions of the display panels, wherein an adhesive tape is disposed on the bezel region to display the patterned projection, and wherein the patterned image data and the image section data combine to form a unified image.

13. The display system of claim 12 further comprising an imaging module communicatively coupled to the display engine, the display system having further instructions stored in the non-transitory machine-accessible storage medium, that when executed by the display system, will cause the display system to perform operations comprising:

measuring image light with the imaging module; and adjusting the patterned projection in response to the measuring the image light.

14. The display system of claim 13, with further instruction stored in the non-transitory machine-accessible storage medium, that when executed by the display system, will cause the display system to perform operations comprising:

analyzing a display brightness and display color properties of the image light generated by the multi-panel display, wherein adjusting the patterned projection in response to the image light includes adjusting a projected brightness of the patterned projection and adjusting projected color properties of the patterned projection.

15. The display system of claim 12 further comprising an imaging module coupled to the display engine, the display system having further instructions stored in the non-transitory machine-accessible storage medium, that when executed by the display system, will cause the display system to perform operations comprising:

imaging the array of display panels; and adjusting dimensions of the patterned projection to fit within the bezel region in response to said imaging the display panels.

16. The display system of claim 12, wherein the projector includes a patterned light guide shaped to output a projection beam in a shape of the pattern.

17. A method comprising:

driving an array of display panels arranged to be viewed as a multi-panel display, wherein driving the array of display panels includes driving the display panels to display image sections; and projecting, from a viewing side of the display system, a patterned projection onto a adhesive tape layer on a front side of the multi-panel display, wherein the adhesive tape layer is covering a bezel region of the multi-panel display, the bezel region being between pixel regions of the display panels of the array, and wherein the patterned projection and the image sections combine to form a unified image on the adhesive tape.

18. The method of claim 17 further comprising:

measuring image light generated by the multi-panel display; and adjusting the patterned projection in response to the measuring the image light.

19. The method of claim 18 further comprising:

analyzing a display brightness and display color properties of the image light generated by the multi-panel display, wherein adjusting the patterned projection includes in response to the image light includes adjusting a projected brightness of the patterned projection and adjusting projected color properties of the patterned projection.

20. The method of claim 17 further comprising:

receiving image source data; and parsing the image source data into image section data for displaying as the image sections on the multi-panel display and patterned image data for projecting as the patterned projection, wherein each of the image sections has a corresponding display panel in the array of display panels.

* * * * *